United States Patent [19]

Harris

[11] Patent Number: 4,558,614
[45] Date of Patent: Dec. 17, 1985

[54] BAND SAW APPARATUS AND METHOD
[76] Inventor: Gerald R. Harris, P.O. Box 1148, Pryor, Okla. 74361
[21] Appl. No.: 577,527
[22] Filed: Feb. 6, 1984
[51] Int. Cl.[4] .................. B23D 53/04; B23D 55/08
[52] U.S. Cl. ........................................ 83/56; 83/788; 83/789; 83/801; 83/820
[58] Field of Search ................ 83/794, 796, 797, 798, 83/800, 801, 820, 799, 788, 789

[56] References Cited

U.S. PATENT DOCUMENTS

| | | | |
|---|---|---|---|
| 1,850,478 | 3/1932 | Schaefer | 83/847 |
| 2,239,317 | 4/1941 | Gibb | 83/855 |
| 2,602,987 | 7/1952 | Wells | 83/800 |
| 3,077,132 | 2/1963 | Whitmore | 83/794 |
| 3,682,030 | 8/1972 | Harris | 83/201.04 |
| 3,941,022 | 3/1976 | Sato et al. | 83/796 |
| 4,023,448 | 5/1977 | Bertini | 83/661 |
| 4,117,756 | 10/1978 | Harris | 83/801 |
| 4,127,045 | 11/1978 | Blucher et al. | 83/796 |
| 4,160,397 | 7/1979 | Bertini | 83/661 |
| 4,195,543 | 4/1980 | Tapply et al. | 83/794 |
| 4,205,571 | 6/1980 | Bertini | 83/661 |
| 4,423,653 | 1/1984 | Howard | 83/820 |
| 4,478,120 | 10/1984 | Sugimoto | 83/71 |
| 4,487,097 | 12/1984 | Hara | 83/56 |

FOREIGN PATENT DOCUMENTS

| | | | |
|---|---|---|---|
| 883602 | 10/1971 | Canada | 83/661 |
| 2875 | 2/1878 | Fed. Rep. of Germany | 83/846 |
| 2330023 | 1/1974 | Fed. Rep. of Germany | |
| 107729 | 7/1982 | Japan | 83/789 |
| 163020 | 10/1982 | Japan | 83/71 |

OTHER PUBLICATIONS

Marvel Series 18 and 24 Hack Saws "Armstrong–Blum Manufacturing Co.-Catalog 18/2400-Chicago, Ill.

Primary Examiner—Frank T. Yost
Assistant Examiner—Hien H. Phan
Attorney, Agent, or Firm—Manfred M. Warren; Robert B. Chickering; Glen R. Grunewald

[57] ABSTRACT

Band saw apparatus are disclosed which include a drive assembly formed for support and guided movement of a saw blade for cutting of a workpiece, an endless band saw mounted to the drive assembly, and reciprocation apparatus formed for reciprocation of the blade toward and away from the workpiece to enable variation of the force per unit area of the cutting edge of the blade on the workpiece. In the preferred form blade reciprocation is provided by a pair of spaced apart guide assemblies each including independently operable fluid piston-cylinder assemblies coupled to a lever carrying guide blocks which engage the back edge of the saw blade. The guide blocks can be reciprocated by the fluid piston-cylinder assemblies in synchronism or out-of-phase to vary the amplitude, frequency and duration of displacement independently of blade speed and at two locations along a length of the blade so as to produce oscillation as well as simple reciprocation. Alternative blade displacement assembly constructions and a method for cutting workpieces employing the apparatus also are disclosed.

11 Claims, 10 Drawing Figures

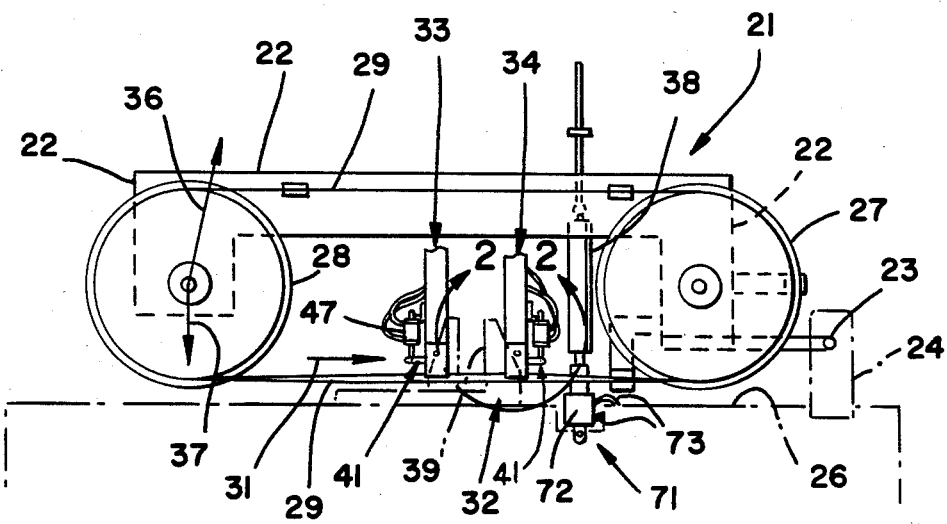
FIG _ 1
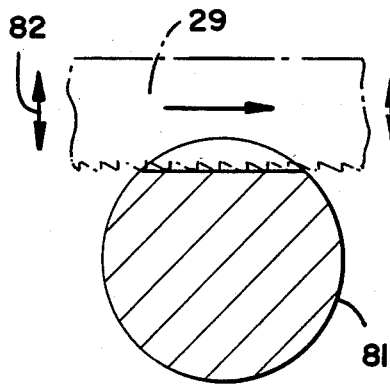
FIG _ 6
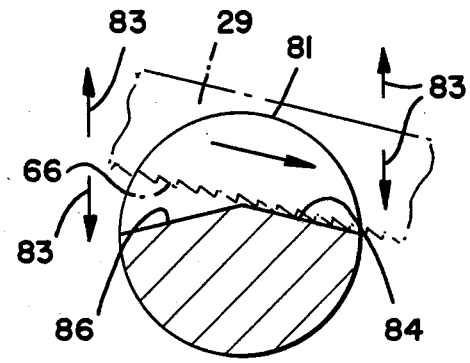
FIG _ 7
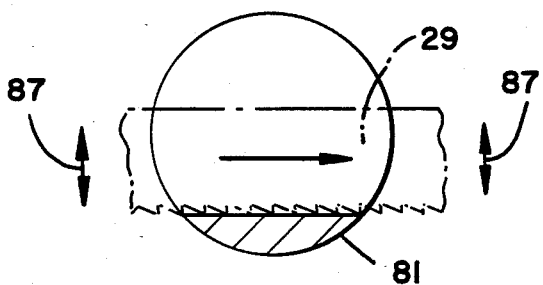
FIG _ 8

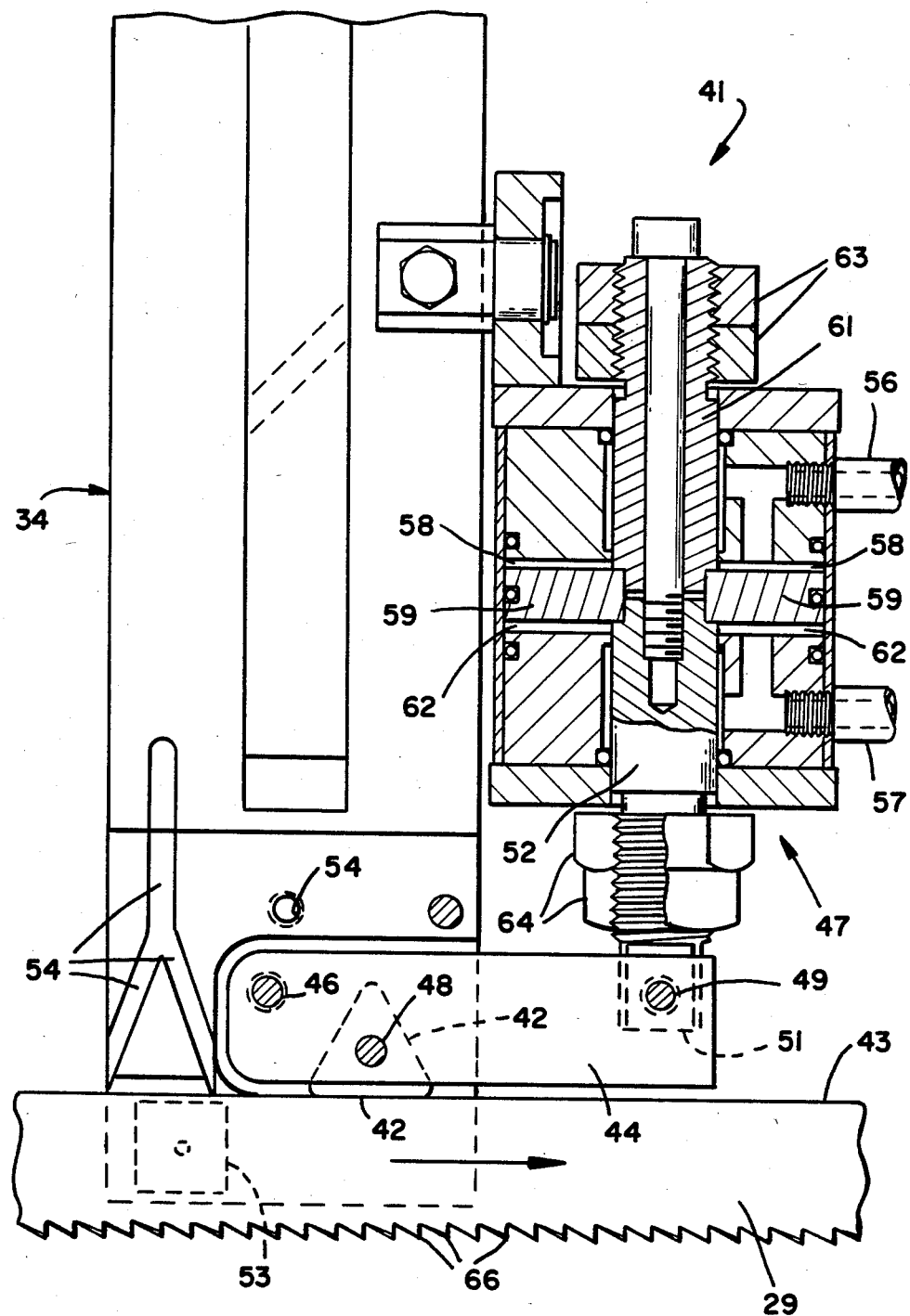
FIG_2

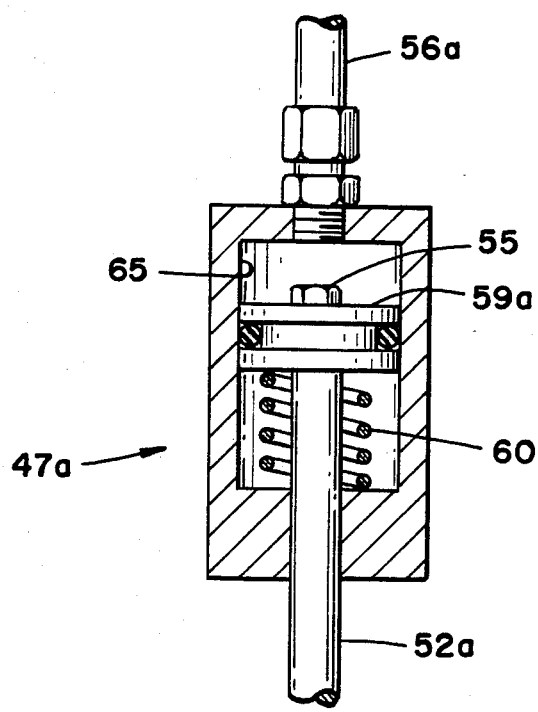
FIG_2A
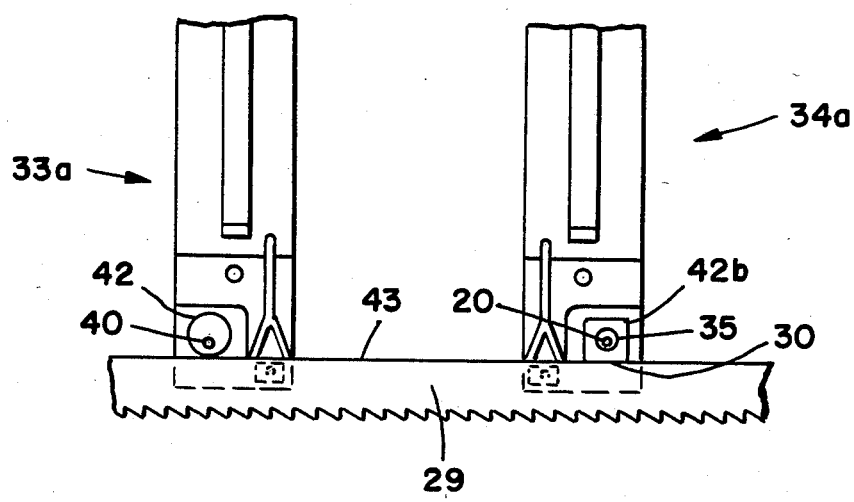
FIG_5A

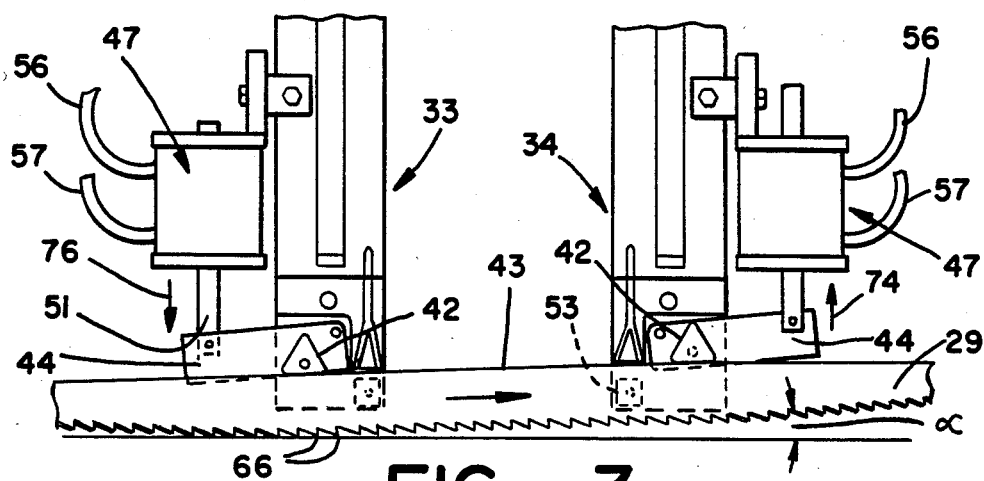
FIG_3
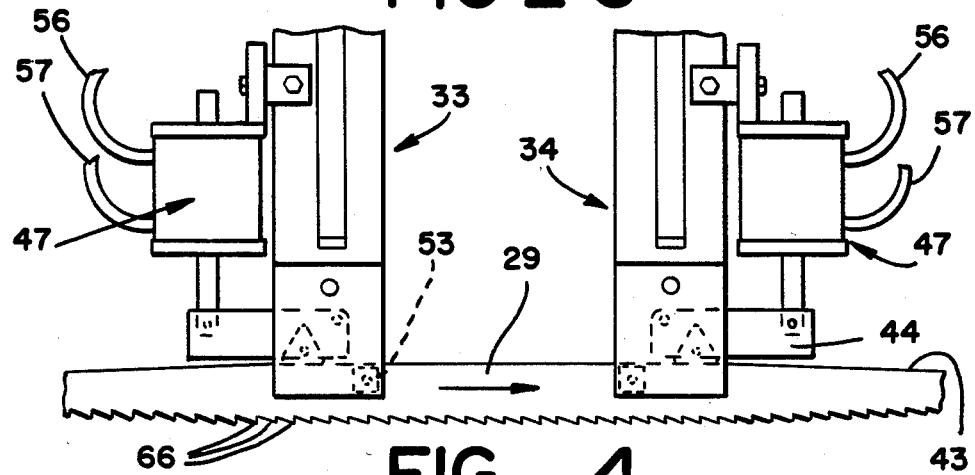
FIG_4
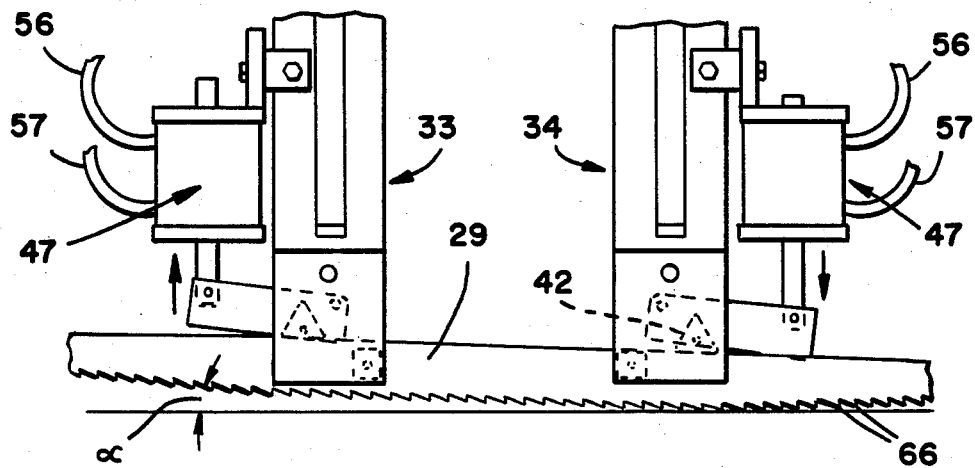
FIG_5

BAND SAW APPARATUS AND METHOD

BACKGROUND OF THE INVENTION

The present invention relates, in general, to band saw apparatus suitable for cutting relatively hard metal objects and, more particularly, relates to an apparatus and method for enhancing cutting rates, cutting precision and blade life by varying the force of the cutting edge of the blade per unit area of the workpiece during cutting Various attempts have been made to enhance the cutting rate of a band saw when cutting hard materials. One approach is to form the band saw blade of a configuration which will induce pressure variations between the cutting edge of the blade and the workpiece being cut. Typical of such efforts is the apparatus set forth in U.S. Pat. Nos. 4,205,571, 4,195,543, 4,160,397 and 4,023,448. In these patents an endless band saw blade is formed with a varying height or side elevational profile so that, as the height variations of the blade pass over guide means, the blade is alternately displaced or urged toward and then permitted to move away from the workpiece. This alternate slight increase and decrease of the localized pressure of the cutting edge of the blade against the workpiece has been found to increase the efficiency of cutting and accordingly reduce the cutting time. This can be quite important in high production cutting of hard metallic materials.

While enhanced cutting efficiency is highly desirable, it would be even more advantageous if it could be achieved without the necessity of having a specially formed band saw blade. Additionally, it is inherent in connection with the use of a sinusoidal, stepped or otherwise specially formed blade that the same areas of the blade which project outwardly toward the workpiece the farthest will undergo the greatest amount of stress and wear. Thus, over the length of a band saw blade, all of the downwardly projecting areas will tend to wear first and to have the greatest potential for blade fatiguing stress risers.

It is possible to change specially formed blades to vary the amplitude of blade displacement and thus pressure applied, and it also is possible to vary the cutting speed to change the frequency of pressure variation. These changes, however, are not easily or quickly accomplished. For band saw apparatus in which the production runs are short and the materials being cut are changed frequently, for example, in a job-shop, repeated blade changing can be a substantial disadvantage.

Another approach to varying the pressure applied by a band saw blade during cutting is disclosed in U.S. Pat. No. 4,127,045. In this patent a band saw is shown which has a blade guiding assembly that is formed to displace the saw blade toward and permit movement away from the workpiece by a step cam and follower. The advantages of localized pressure variation without many of the disadvantages of a specially formed blade can be achieved.

The apparatus of U.S. Pat. No. 4,127,045 employs a feature which is well known in the cutting art, and partcularly in connection with power back saws and power grinders, namely, variation of the angle of cutting during the cut. MARVEL brand hack saws, produced by Armstrong-Blum Manufacturing Co. of Chicago, Ill., have for many years used a "Roll Stroke" blade motion which progressively raises one end of the saw blade while lowering the other as the blade is drawn though the work. Grinders similarly have been constructed in which the pivotal arm upon which the abrasive wheel is mounted is itself eccentrically mounted to displace the pivot point of the arm and thereby vary the area being cut.

OBJECTS AND SUMMARY OF THE INVENTION

Objects of the Invention

It is an object of the present invention to provide band saw apparatus in which the cutting area of the band saw blade against the workpiece can be varied, with the frequency, amplitude and duration of cutting along a given area being varied without regard to cutting speed or blade configuration to enable tuning of the variation of the cutting area to the specific workpiece being cut.

Another object of the present invention is to provide band saw apparatus and method in which the angle of engagement of the workpiece by the cutting edge of the blade can be more efficiently varied during cutting so as to enhance the efficiency and reduce the time of cutting.

Still a further object of the present invention is to provide a method for cutting a metallic workpiece which affords greater cutting efficiency while minimizing cutting blade fatigue.

Still another object of the present invention is to provide a method for cutting a hard, metallic workpiece or the like which reduces the set up time between the cutting of different materials or objects, provides the user with greater flexibility and control during cutting, and allows tailoring of the cutting to the shape of the workpiece being cut.

Another object of the present invention is to provide an improved method for cutting workpieces having a generally round cross-section.

Still a further object of the present invention is to provide band saw blade displacement apparatus which can be easily adapted to existing band saws to enhance cutting efficiency and which can be employed on both vertical and horizontal band saws.

Still another object of the present invention is to provide band saw apparatus which is durable, easy to use, and employs standard band saw cutting blades.

The band saw apparatus and method of the present invention have other features and objects which will be apparent from or are set forth in more detail in the accompanying drawing and following description of the preferred embodiments.

Summary of the Invention

The band saw apparatus of the present invention includes blade drive means formed for support and guided movement of a saw blade for cutting a workpiece, an endless band saw blade mounted to the drive means, and reciprocation means formed to produce variation of the cutting area of the workpiece during movement of the saw blade. The improvement in the band saw apparatus of the present invention comprises, briefly, the reciprocation means including two spaced apart blade support assemblies each formed for reciprocation toward and away from the workpiece to enable variation of the cutting of the workpiece. In the preferred form, blade guides include guide block elements mounted in sliding engagement with a back edge of the saw blade, and the guide elements are in turn mounted on are coupled (directly or through levers) to fluid actuators so that displacement at relatively spaced apart locations along the back edge of the blade toward and away from the workpiece can be accomplished. The frequency, amplitude, duration and phasing between the two spaced-apart reciprocating guide assemblies can be independently varied so as to tune vibration and cutting area variations to the specific material and object being cut for a maximum cutting efficiency.

The method of cutting a workpiece of the present invention includes the steps of moving a saw blade across the workpiece to effect cutting and simultaneously varying the force per unit area of the workpiece. In the improved method of the present invention, the step of varying the force per unit area of the saw blade on the workpiece is accomplished independently of the rate of movement of the saw blade and by mechanically displacing the back edge of the saw blade at spaced apart location toward and away from the workpiece.

DESCRIPTION OF THE DRAWING

FIG. 1 is a side elevational view of the arm portion of a pivotal arm, horizontal band saw with the wheel housing, removed and including the blade displacement apparatus of the present invention.

FIG. 2 is an enlarged, fragmentary, cross-sectional view of the area bounded by line 2—2 in FIG. 1 showing blade displacement apparatus constructed in accordance with the present invention.

FIG. 2A is a fragmentary, side elevational view, in cross section of an alternative embodiment of the fluid cylinder of FIG. 2.

FIGS. 3, 4 and 5 are fragmentary, side elevational views of band saw guide assemblies constructed in accordance with the present invention with the blade displaced upwardly on the righthand side of the displacement apparatus, both guides in a neutral position, and the blade displaced upwardly on the lefthand side of the apparatus, respectively.

FIG. 5A is a fragmentary, side elevational view of an alternative embodiment of band saw guide assemblies constructed in accordance with the present invention.

FIGS. 6, 7 and 8 are enlarged, cross-sectional views through a round workpiece illustrating the method of cutting a workpiece of the present invention.

DESCRIPTION OF THE PREFERRED EMBODIMENTS

The method and apparatus of the present invention are suitable for use with a wide variety of horizontal and vertical band saws. For purposes of illustration, FIG. 1 shows a horizontal pivotal arm band saw constructed in a manner more fully set forth in my U.S. Pat. No. 3,682,030, but having mounted thereon the band saw blade displacement apparatus of the present invention. Band saw 21 includes a horizontally extending arm 22 which is pivotally mounted at 23 to mounting flange 24 extending upwardly from base 26 of the saw. Rotatably mounted proximate opposite ends of arm 22 are a drive wheel 27 and an idler wheel 28 upon which an endless band saw blade 29 is mounted. Saw blade 29 advances in the direction of arrow 31 across a cutting stretch 32 between a pair of spaced-apart guide assemblies 33 and 34.

The pivotal arm band saw can be displaced in the direction of arrows 36 and 37 by pneumatic lift cylinder 38 mounted on base 26. The arm is initially lifted upwardly in the direction of arrow 36 until it is above a workpiece (not shown but normally held by vice means 39). Cylinder 38 then allows the saw arm to pivot about mount 23 downwardly in the direction of arrow 37 as a saw blade is advanced so as to cut the workpiece. For purposes of simplicity of illustration, the saw of FIG. 1 has the wheel housings removed. Additionally, it will be understood that guide assemblies 33 and 34 are carried by arm 22, and the guide assemblies twist blade 29 from its horizontal orientation on the drive and idler wheels to substantially a vertical orientation across cutting stretch 32.

As thus far described, the band saw apparatus is well known in the prior art. Moreover, the apparatus of the present invention is equally adaptable for use on vertical band saws, for example as shown in my U.S. Pat. No. 4,117,756.

Band saw 21 further includes displacement or reciprocation means 41 formed and mounted to reciprocate blade 29 toward and away from the workpiece during cutting of the same. Broadly, blade displacement means are known in the prior art and not regarded as a novel portion of the present invention. Such apparatus as disclosed in U.S. Pat. No. 4,127,045, however, make only limited use of the phenomenon of reduction of the cutting area engaged by the saw blade by varying the contact angle it employs a single reciprocation means which can change the angle of contact only slightly about the pivot point of the arm. Additionally, a single point displacement system limits the ability to superimpose varying frequencies and amplitudes of displacement to achieve an optimum or tuned vibration pattern for the particular material and shape being cut.

In the improved band saw apparatus of the present invention reciprocation means 41 is provided by two relatively spaced apart blade support assemblies each of which is formed and mounted for reciprocation toward and away from the workpiece to enable variation of the angle of the cutting edge of the blade to increase the cutting force per unit area or localized pressure of the blade against the workpiece.

As best may be seen in FIG. 2, reciprocation means 41 on each blade support assembly preferably includes a blade support or guide block 42 mounted for engagement with the back edge 43 of saw blade 29. Blade support means 42 further includes lever means 44 pivotally mounted at 46 to an end of guide assembly 34. Coupled to an opposite end of lever means 44 is a double-acting spool valve or piston and cylinder, generally designated 47, wich may be pneumaticly or hydraulicly acuated. It is preferable that blade guide block 42 be pivoted to lever 44 at 48, and that lever 44 actually be formed as a pair of lever arms on either side of the central guide block. The pair of arms can be pivoted at 49 to the end 51 of movable piston element 52.

In order to twist the blade into a vertical orientation, it is preferable that guide assemblies further include a pair of guide blocks 53 which engage the sides of blade 29. As shown in FIG. 2, only one block 53 is visible, but it will be understood that a second half of the lower guide assembly carrying a similar block 53 is attached to the end of the guide by a fastener mounted into threaded bore 54. FIG. 3 corresponds to FIG. 2 in that the outside halves of the guide assemblies have been removed, but FIGS. 4 and 5 show the assemblies with the other half of the ends of the guides secured in place so that a carbide guide block 53 engages each side of blade 29, in a manner well known in the art. The guide assemblies also preferably include coolant channels 54 for the discharge of fluid coolant down on the back edge 43 and sides of the blade.

Fluid piston-cylinder assembly 47 is operated by communicating fluid through one of lines 56 and 57, for purposes of illustration through line 56, to cylinder 58. The fluid in cylinder 58 causes washer or flange 59 mounted on central longitudinally extending shaft 61 to be downwardly displaced, for example, by a distance of 0.180 inches (4.5 millimeters), which in turn causes backup guide 42 move 0.060 inches (1.5 millimeters). When fluid is supplied in line 57 and allowed to escape through line 56, cylinder 62 is receives fluid, and the flange and shaft are upwardly displaced. Lock nuts 63 and 64 can be used to easily vary the amplitude of displacement. It will be seen that displacement need not be very great in order to generate a substantial displacement at cutting edge 66 of the blade. As will be readily understood, the vertical displacement of the end 51 of shaft 61 is transmitted by lever 44 to guide block or blade engaging support 42. This in turn causes displacement of the edge 43 of the blade and a downward displacement and a slight localized increase in pressure of the cutting edge or teeth 66 against the workpiece.

Displacement of blade 29 by a pair of spaced-apart blade guiding assemblies has several important advantages over a single point displacement assembly. First, as will be described in more detail hereinafter, it enables very substantial changes in the angle at which the workpiece is contacted during cutting. Instead of pivoting around arm pivot point 23, displacement means 41 can be run out of synchronism so as to rock or see-saw the blade through angles which are much greater than can be accomplished by a single point displacement means for the same amplitude of displacement.

Second, each of the reciprocation assemblies 41 can be independently operated. Thus, it is possible to superimpose different displacement frequencies and amplitudes on top of each other, as well as operating the displacement assemblies in synchronism. This allows the user to tune or adjust displacement patterns until the optimum for a particular workpiece is achieved. It is also advantageous to employ two relatively low inertia guide block displacement assemblies rather than to reciprocate a relatively high inertia arm.

Additionally, variation or increase and decrease in the area being cut by cutting edge 66 can be accomplised at a frequency which is totally independent of the shape or configuration of blade 29. Moreover, the amplitude of displacement is also totally independent of the shape or configuration of blade 29. Still further, it is possible to vary the length of time or duration at which the blade is in various cutting angles with respect to the workpiece.

The independent variation of frequency, amplitude and duration of the possible when using the apparatus of the present invention has other important advantages. First, the band saw blade can be any standard or conventional blade. Since there are many different types of band saw blades (e.g. Raker set, wavy set, standard tooth, hook tooth, skip tooth, and various tooth rakes) one can achieve the benefits of blade vibration with virtually any blade. Additionally, the ability to vary frequency, amplitude and duration minimizes blade wear since the cutting force and large chip load will be more evenly distributed over the length of the blade.

Pneumatic and hydraulic controllers are well known in the art which are capable of attachment to fluid piston-cylinder assembly 47 to produce and vary the frequency of fluid pulses to either side of the spool or flange 59. In the preferred form, such controllers can be computer assisted with measurement apparatus (not shown) used to feed back the cutting rate for optimization of frequency, duration and blade speed, all of which can be independently altered. In the apparatus shown in the drawing, amplitude is controlled by the lock nuts 63 and 64 and can be manually altered, but it will be understood that more elaborate apparatus for automatic controlled variation of amplitude can also be incorporated into the fluid piston-cylinder assembly 47.

An alternate embodiment of fluid piston and cylinder assembly 47 is shown in FIG. 2A. Coupled directly to a guide block (not shown), or indirectly through a lever arm (not shown), is piston rod 52a which is connected by fastener 55 to piston 59a. In order to produce a reciprocal motion, piston 59a is biased by spring biasing means 60 in a direction opposed to displacement produced by introducing fluid into cylinder 65 through fluid conduit 56a. Again, fluid piston-cylinder assembly 47a enables variation of the frequency, amplitude and duration of the displacement of the blade against the workpiece by controlling the fluid flow to cylinder 65 against which spring 60 works.

In the preferred form of the invention, the mechanical reciprocation of band saw blade 29 is accomplished by blade support means mounted to a pair of blade guide assemblies of the band saw. Reciprocation of blade support means also can be accomplished, however, by displacing the entire arm 22 toward and away from the workpiece, either alone or in combination with reciprocation at the guide assemblies. Thus, arm displacement means, generally designated 71, may be coupled to arm 22 for reciprocation of the arm toward and away from the workpiece to enable variation of the displacement of the cutting edge of the blade during advancement across the workpiece. In the preferred form of this embodiment, a fluid piston-cylinder assembly 72 can be mounted in series with lift cylinder 38. Fluid piston-cylinder 72 can be constructed substantially as shown in connection with piston-cylinder assembly 47 and coupled by conduit means 73 to a controller.

The use of arm displacement means 71 to effect mechanical vibration of the saw blade allows a variation of the frequency, amplitude and duration of the vertical stroke of the blade independently of the speed of advancement of the saw blade.

The improved method of the present invention and the variations in cutting force per unit area which can be achieved through the method and apparatus of the present invention are best understood by reference to FIGS. 3 through 5. One of the advantages of vibrating or reciprocating a blade support element mounted to guide means for the saw blade is that two spaced apart blade support members on the spaced apart guide assemblies can be used to oscillate the blade, as well as vertically reciprocate the same.

Oscillation of the blade can be accomplished by operating the two stroke cylinders 47 out of phase. Thus, as shown in FIG. 3, the righthand lift cylinder and lever 44 are in an up position, as shown by arrow 74, while the lefthand piston cylinder assembly 47 is in the down position, as shown by arrow 76. The downward displacement of the left side and upward displacement of the right side causes the blade to lift upwardly by an angle $\alpha$.

In FIG. 4, both stroke cylinders 47 are in a neutral position, which can be an intermediate position between the orientation of FIGS. 3 and 5 or illustrative of mid-stroke when the two stroke cylinders are reciprocated in synchronism. Finally, in FIG. 5, the positions of the cylinders of FIG. 3 have been reversed with the result that the angle $\alpha$ is now producd as an opposite or mirror image of that produced in FIG. 3.

As will be understood, operation of cylinders 47 can be synchronized out of phase so as to produce a constant oscillation of blade 29. In addition to oscillating the blade, various complex reciprocation modes can be employed. It is possible, for example, to operate one of stroke cylinders 47 at twice the frequency of the other so that there are various in-phase and out-of-phase displacements. It is also possible to hold one of the cylinders in a neutral position while the other is displaced down and then up, and thereafter to hold the reciprocating one and displace the first one which was held through a stroke. Thus, it is a very important feature of the present invention that the mechanical reciprocation of the band saw blade can be accomplished at at least two distinct, spaced-apart locations along the length of the blade so as to enable oscillation, reciprocation and combinations thereof. Using a computer to run the pneumatic controller, it is readily possible to program very complex blade reciprocation patterns so as to produce optimum cutting efficiency.

An illustration of the method of the present invention and the advantages of the apparatus of the present invention can best be understood by reference to FIGS. 6, 7 and 8. As will be seen, a piece of round stock or workpiece 81 is being cut by blade 29 using the apparatus of the present invention. In FIG. 6, blade 29 is generally horizontally oriented, and the stroke cylinders are being operated in synchronism for purely vertical displacement, as indicated by arrows 82. Such vertical reciprocation is continued until blade 29 has cut through approximately 10 to 20 percent, and preferably 15 percent, of the diameter of workpiece 81. Once the saw has cut through about 15% of the diameter, the stroke cylinders 47 are operated so as to cause oscillation of blade 29, as indicated by arrows 83. This oscillation results in a cut in which there are two beveled surfaces 84 and 86 against which the cutting edge 66 is alternately cutting. The angles of these surfaces are exaggerated in FIG. 7 for the purpose of illustration, and they would normally be equal to the angle $\alpha$ from the horizontal cut as shown in FIGS. 3 and 5 or 2 $\alpha$, between cutting edge 66 and surface 86. The cutting is continued in an oscillation mode until approximately 80 to 90 percent of the diameter has been cut, at which point the cylinders are operated in synchronism again, as shown in FIG. 8 and indicated by arrows 87, until the round stock is cut completely through.

As will be seen from FIG. 7, the advantage of oscillating is to reduce the length of surface being cut at any one time during oscillation. When round stock is being cut the effective cross section width can be reduced by oscillation in the center of the cut. The outside edges of round stock tend to have a lesser cross section in any event and oscillation is not required. For rectangular bar stock, it is advantageous to start the cut without oscillating until the cut is established then oscillate the blade through the substantially entire cut as a way of reducing the length of the blade in contact with the workpiece during the cut, with the cut being completed without oscillation to avoid a sudden break through of the thin section and stalling of the saw (the last 5 percent or less).

While a conventional band saw employs means such as fluid cylinder 38 to control the rate of lowering of the saw frame toward the workpiece, it has been found that when using the blade displacement apparatus of the present invention, it is advantageous not to use a fluid cylinder 38 to control lowering of the saw blade. It is hypothesized that operation of cylinder 38 constrains movement of frame arm 22 in a manner which reduces the effectiveness of displacing the blade by the assemblies of the present invention. Accordingly, when the blade is being displaced or oscillated it is most preferable that fluid cylinder 38 be "off" or not powered so that gravity is the sole force urging arm 22 down toward the workpiece.

Further alternative embodiments of the present invention are illustrated in FIG. 5A. Guide assembly 33a is provided with an eccentrically mounted cylindrical guide element or block 42a which is formed for rolling engagement with back edge 43 of blade 29. A rotary motor (not shown) is coupled to block 42 and formed for rotation of the same during advancement of the blade about a shaft 40 which is eccentric to the surface of the block which engages the saw blade.

Guide assembly 34a includes a guide element 42b which has a planar blade engaging surface 30 formed for sliding engagement with back edge 43 of the blade. In order to provide for reciprocation of blade 29, guide element 42b includes an eccentrically mounted element 35 formed for rotation about and driven by shaft 20. A rotary motor (not shown) drives shaft 20.

Each of guide assemblies 33a and 34a, therefore, can be used in pairs of similarly formed assemblies and in various combinations with other blade displacing assemblies.

What is claimed is:

1. A method of cutting a workpiece with a band saw or the like having carriage means movably mounted or advancement of said saw blade toward said workpiece to effect cutting, including the steps of moving a cutting stretch of a saw blade between two blade support assemblies carried by said carriage means across said workpiece to effect cutting, and simultaneously and periodically varying the force per unit area of said saw blade against said workpiece, wherein the improvement in said method of cutting is comprised of:

said varying step is accomplished by displacing a portion of both of said blade support assemblies in opposed directions relative to said carriage means to periodically tilt said cutting stretch relative to said carriage means between said support assemblies to reduce the area of said workpiece engaged by said cutting stretch and increase the force per unit area.

2. A method of cutting a workpiece as defined in claim 1 wherein, during said varying step, varying one of the frequency and amplitude of displacement of said portions of both of said support assemblies.

3. A method of cutting a workpiece with a band saw or the like having automatic control means for advancing a movable carriage having the saw blade mounted thereto toward said workpiece to effect cutting which comprises the steps of:

(a) advancing the saw blade across said workpiece while said control means is controlling the rate of advancing of said carriage and feeding of said blade into said workpiece to effect cutting entry into said workpiece;

(b) after entry of said blade into said workpiece, substantially disengaging said control means and periodically displacing the cutting edge of said saw blade relative to said carriage toward and away from said workpiece while said control means is disengaged and during said advancing step; and (c) prior to exiting said blade from said workpiece, terminating said displacing step and engaging said control means to control the rate of advancing of said carriage and feeding of said blade during said advancing step until said blade exits said workpiece.

4. A method of cutting a workpiece as defined in claim 3 wherein, said workpiece is round stock and said displacing step is accomplished between cutting of about the first and last about 10 to about 20 percent of the diameter of said stock, and said displacing step is accomplished by periodically tiliting the cutting stretch of said blade relation to said carriage between two spaced apart blade support assemblies.

5. Band saw apparatus including, movable carriage means, a pair of blade supporting wheels rotatably mounted to said carriage means and formed for support and movement of a saw blade thereon for cutting of a workpiece, an endless bandsaw blade mounted to said wheels and having a cutting stretch extending between said wheels, a pair of relatively spaced apart blade support assemblies mounted to said carriage means and each formed to engage said blade at spaced apart locations along said cutting stretch for support of said blade during cutting, and displacement means formed and mounted to reciprocate said blade toward and away from said workpiece during cutting movement of said blade, wherein the improvement in said band saw apparatus comprises:

said displacement means being mounted to each of said support assemblies and formed for displacement of a blade engaging portion of each of said support assemblies for displacement of said cutting stretch of said blade relative to said carriage means at spaced apart locations along said blade; and control means coupled to said displacement means and formed to control displacement of said blade engaging portion of each of said assemblies to produce alternating tilting of the angle of engagement of said cutting stretch by raising of one end of said cutting stretch relative to said carriage means and substantially simultaneous lowering of the other end of said cutting stretch relative to said carriage means.

6. Band saw apparatus as defined in claim 5 wherein, said displacement means is formed for variation of all of:

(a) the frequency of raising and simultaneous lowering of the ends of said cutting stretch, and (b) the amplitude of raising and simultaneous lowering of the ends of said cutting stretch.

7. Band saw apparatus as defined in claim 6 wherein, said displacement means is further formed for variation of the duration between raising and lowering of the ends of said cutting stretch of said blade.

8. Band saw apparatus as defined in claim 5 wherein, at least one of said support assemblies includes a guide elements mounted in engagement with a back edge of said blade; and said displacement means includes lever means coupled to said guide elements, a fluid piston-cylinder assembly coupled to said lever means, and said control means is coupled to actuate and control displacement of said piston-cylinder assembly.

9. Band saw apparatus as defined in claim 5 wherein, at least one of said support assemblies includes an eccentrically mounted cylindrical guide element formed for rolling engagement about an axis substantially perpendicular to the plane of said blade with a back edge of said blade; and said displacement means is coupled to rotate said guide element during advancement of said blade.

10. Band saw apparatus including, blade drive means having a movable carriage formed for support and movement of a saw blade thereon for cutting of a workpiece, an endless bandsaw blade mounted to said carriage; a pair of relatively spaced apart blade support assemblies mounted to said carriage and each having a guide element formed to engage a back edge of said blade at spaced apart locations along said blade; displacement means including a fluid piston-cylinder assembly coupled to produce displacement of said guide element and formed and mounted to reciprocate said blade toward and away from said workpiece during cutting movement of said blade; and control means coupled to actuate and control displacement of said piston-cylinder assembly, wherein the improvement in said band saw apparatus comprises:

said piston-cylinder assembly including spring biasing means coupled to displace a movable one of said piston and cylinder relative to said carriage in a direction opposed to displacement produced in said piston-cylinder assembly by the fluid.

11. Band saw apparatus including, blade drive means formed for support and movement of a saw blade thereon for cutting of a workpiece, and endless bandsaw blade mounted to said drive means, a pair of relatively spaced apart blade support assemblies each having a guide element formed to engage said blade at spaced apart locations along the length of said blade, and displacement means coupled to at least one of said support assemblies and formed and mounted to reciprocate said guide element toward and away from said workpiece during cutting movement of said blade, wherein the improvement in said bandsaw apparatus comprises:

said one of said support assemblies including a guide element having a planar surface formed for sliding engagement with a back edge of said blade; and said displacement means is provided by mounting means for said guide elements including an eccentrically mounted element coupled to said guid element for displacement thereof toward and away from said blade upon rotation of said shaft.

* * * * *

UNITED STATES PATENT AND TRADEMARK OFFICE
CERTIFICATE OF CORRECTION

PATENT NO. : 4,558,614

DATED : December 17, 1985

INVENTOR(S) : Gerald R. Harris

It is certified that error appears in the above-identified patent and that said Letters Patent is hereby corrected as shown below:

IN THE CLAIMS:

Claim 4, Column 9, line 22, delete "relation" and insert ---relative---;

Claim 2, Column 8, line 59, delete "portions" and insert ---portion---;

Claim 8, Column 10, line 6, delete "elements" and insert ---element---; and

Claim 8, Column 10, line 6, delete "elements" and insert ---element---.

Signed and Sealed this

Seventeenth Day of June 1986

[SEAL]

Attest:

DONALD J. QUIGG

Attesting Officer

Commissioner of Patents and Trademarks

REEXAMINATION CERTIFICATE (661st)

United States Patent [19]

Harris

[11] B1 4,558,614

[45] Certificate Issued  Mar. 31, 1987

[54] BAND SAW APPARATUS AND METHOD

[76] Inventor: Gerald R. Harris, P.O. Box 1148, Pryor, Okla. 74361

Reexamination Request:
No. 90/000,993, Apr. 24, 1986

Reexamination Certificate for:
Patent No.: 4,558,614
Issued: Dec. 17, 1985
Appl. No.: 577,527
Filed: Feb. 6, 1984

Certificate of Correction issued Jun. 17, 1986.

[51] Int. Cl.⁴ .................. B23D 53/04; B23D 55/08
[52] U.S. Cl. .................................. 83/56; 83/788; 83/789; 83/801; 83/820
[58] Field of Search .......... 83/794, 788, 789, 796–801, 83/820; 92/130 R

[56] References Cited

U.S. PATENT DOCUMENTS 3,955,479  5/1976  McLuckie .................. 92/130 R X
4,546,682  10/1985  Howard ........................... 83/13

*Primary Examiner*—Frank T. Yost

[57] ABSTRACT

Band saw apparatus are disclosed which include a drive assembly formed for support and guided movement of a saw blade for cutting of a workpiece, an endless band saw mounted to the drive assembly, and reciprocation apparatus formed for reciprocation of the blade toward and away from the workpiece to enable variation of the force per unit area of the cutting edge of the blade on the workpiece. In the preferred form blade reciprocation is provided by a pair of spaced apart guide assemblies each including independently operable fluid piston-cylinder assemblies coupled to a lever carrying guide blocks which engage the back edge of the saw blade. The guide blocks can be reciprocated by the fluid piston-cylinder assemblies in synchronism or out-of-phase to vary the amplitude, frequency and duration of displacement independently of blade speed and at two locations along a length of the blade so as to produce oscillation as well as simple reciprocation. Alternative blade displacement assembly constructions and a method for cutting workpieces employing the apparatus also are disclosed.

B1 4,558,614

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 6, lines 12-24:

An alternate embodiment of fluid piston and cylinder assembly 47 is shown in FIG 2A. Coupled directly to a guide block (not shown), or indirectly through a lever arm (not shown), is piston rod 52a which is connected by fastener 55 to piston 59a. In order to produce a reciprocal motion, piston 59a is biased by spring biasing means 60, *mounted between movable piston 59a and stationary cylinder 65, to urge piston 59a independently of the gravity force on the saw carriage* in a direction opposed to displacement produced by introducing fluid into cylinder 65 through fluid conduit 56a. Again, fluid piston-cylinder assembly 47a enables variation of the frequency, amplitude and duration of the displacement of the blade against the workpiece by controlling the fluid flow to cylinder 65 against which spring 60 works.

AS A RESULT OF REEXAMINATION, IT HAS BEEN DETERMINED THAT:

The patentability of claims 3-9 and 11 is confirmed.

Claim 10 is cancelled.

Claim 1 is determined to be patentable as amended.

Claim 2, dependent on an amended claim, is determined to be patentable.

1. A method of cutting a workpiece with a band saw or the like having carriage means movably mounted for advancement of said saw blade toward said workpiece to effect cutting, including the steps of moving a cutting stretch of a saw blade between two blade support assemblies carried by said carriage means across said workpiece to effect cutting, and simultaneously and periodically varying the force per unit area of said saw blade against said workpiece, wherein the improvement in said method of cutting is comprised of:

said varying step is accomplished by displacing a portion of both of said blade support assemblies [in opposed directions] *with one portion moving in one direction and a remaining portion substantially simultaneously moving in an opposite direction* relative to said carriage means to periodically tilt said cutting stretch relative to said carriage means between said support assemblies to reduce the area of said workpiece engaged by said cutting stretch and increase the force per unit area.

* * * * *